(12) United States Patent
Shing et al.

(10) Patent No.: US 7,512,193 B1
(45) Date of Patent: Mar. 31, 2009

(54) CIRCUIT AND METHOD FOR PRE-EMPHASIS IN DATA SERIALIZATION

(75) Inventors: Peter Shing, San Jose, CA (US); Min Du, Sunnyvale, CA (US); Xin Liu, Mountain View, CA (US); Qingping Zheng, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 706 days.

(21) Appl. No.: 11/120,726

(22) Filed: May 2, 2005

(51) Int. Cl.
   *H04L 25/49* (2006.01)
(52) U.S. Cl. .................. 375/296; 375/295; 327/291; 332/106; 341/20; 341/173
(58) Field of Classification Search ............. 357/296; 375/296, 295; 327/291; 332/106; 341/20, 341/173
   See application file for complete search history.

(56) References Cited

U.S. PATENT DOCUMENTS 6,466,491 B2 * 10/2002 Yanagawa ............... 365/194
6,622,256 B1 * 9/2003 Dabral et al. ............. 713/600
7,095,264 B2 * 8/2006 Jenkins et al. ............ 327/276
7,224,952 B2 * 5/2007 Boecker et al. ........... 455/260

* cited by examiner

*Primary Examiner*—Shuwang Liu
*Assistant Examiner*—Helene Tayong

(57) ABSTRACT

A circuit for pre-emphasis in data serialization. The circuit has a signal delayline to incrementally delay a serialized signal, producing a delayed serialized signal. The circuit has a one bit generator circuit, which determines the interval between receipt of one bit and a second bit. The one bit generator circuit has a strobe delayline to incrementally delay a strobe signal, producing a delayed strobe signal, a logical gate to compare the delayed strobe signal with a second strobe signal, and a logical component to determine how long the delayed strobe signal was delayed before it matched the second strobe signal. The circuit also has a comparison gate to detect transition points in the serialized signal by comparing the delayed serialized signal with the serialized signal. The circuit also has a current source to provide increased current for the serialized signal at the detected transition points.

5 Claims, 4 Drawing Sheets

Pre-Emphasis Circuit 200

CIRCUIT AND METHOD FOR PRE-EMPHASIS IN DATA SERIALIZATION

BACKGROUND

1. Field of the Invention

The present invention relates to data serialization in general, and to pre-emphasis in high-speed data serialization applications in particular.

2. Related Art

High-speed data serialization is an important technique for transmitting data from a transmitter to a receiver. Such techniques are commonly used in portable computing devices, when data needs to be transferred from a video card to a monitor or other display. Other applications of similar technologies can be found in cellular base stations, where high-speed data serialization is used to pass data between various subsystems. The underlying process for high-speed data serialization is relatively straightforward: a number of slower signals are combined to make a single, faster signal; the same amount of data is transferred in the same amount of time, but far fewer separate signals must be maintained. An example would be the combination of ten separate 10-Megabit signals into a single 1-Gigabit signal.

When data is serialized and transmitted over a medium, such as a cable, the signal is subject to degradation. In differential signals, this manifests as the loss of "transition points", places where the waveforms cross. See FIG. 1A. Differential signal 101 has transition points as designated by arrows 111 and 112. This degradation is most common in the cases of long 1's in conjunction with short 0's (and long 0's in conjunction with short 1's). In such situations, the transfer medium, e.g. the cable, reaches a state of high (or low) voltage, and the short change in state is not long enough to allow the medium to fully discharge. See FIG. 1B. Differential signal 121 has changes in state at arrows 131 and 132, but the change is too short to allow the medium to discharge; no transition point occurs.

Signal degradation is a well-known problem in the field, and the commonly adopted solution is to use pre-emphasis. Pre-emphasis involves detecting transition points and applying additional current at the detected points. Additional current is provided only at transition points, as most applications that require pre-emphasis are also sensitive to power consumption, e.g. notebook computers. Two approaches are commonly used for pre-emphasis. In both cases, detecting transition points involves comparing the serialized signal with a slightly delayed version of the same stream. Where transition points occur, the signal and the delayed signal will differ. See FIG. 1C. Signal 141 and delayed signal 151 are identical, except that delayed signal 151 is one bit-width behind signal 141. Transition points are detected at times where the signals do not match, as indicated by arrows 161, 162, 163, and 164. It should also be noted that signal 141 has a "long 1, short 0" at the time interval indicated by arrow 162.

In the first approach to pre-emphasis, serialized data enters the circuit and is duplicated. One copy of the signal flows directly to an XOR gate, while the other flows first into a series of fixed delays and then into the same XOR gate. In the XOR gate, the two signals are compared; when a difference is detected, a transition point has occurred and additional current should be applied. The fundamental weakness to this approach is in the nature of the fixed delays. Bit-width, i.e. the time between receipt of one bit of information and the receipt of the next, is not a constant: it obviously varies with frequency. Also, the fixed delays built into circuits of this type are not always constant; the delays change with variations in process, voltage, and temperature (PVT); a 1 nanosecond delay could become a 2 ns delay, or 0.5 ns. As such, circuits embodying this approach may well be applying pre-emphasizing current where it is not called for, or not applying current where it should.

The second approach handles frequency and PVT variations far better. During the serialization process, two serialized signals are created, one skewed one exactly one bit behind the other. These two signals will always be precisely one bit-width apart, and can be compared by an XOR gate to determine where pre-emphasis should be applied. The drawbacks to this approach are not related to its effectiveness, but rather to its desirability. The circuits involved in creating two separate serialized signals are more expensive and far more demanding in terms of energy than duplicating a single signal and delaying it. This is of crucial importance in the portable computing market, where efficient power consumption is vital.

At present, no single approach to pre-emphasis in data serialization provides a low-power solution to the signal degradation problem that allows for variation in frequency, or fluctuation in delays caused by PVT factors.

SUMMARY

A circuit for pre-emphasis in data serialization. The circuit has a signal delayline to incrementally delay a serialized signal, producing a delayed serialized signal. The circuit has a one bit generator circuit, which determines the interval between receipt of one bit and a second bit. The one bit generator circuit has a strobe delayline to incrementally delay a strobe signal, producing a delayed strobe signal, a logical gate to compare the delayed strobe signal with a second strobe signal, and a logical component to determine how long the delayed strobe signal was delayed before it matched the second strobe signal. The circuit also has a comparison gate to detect transition points in the serialized signal by comparing the delayed serialized signal with the serialized signal. The circuit also has a current source to provide increased current for the serialized signal at the detected transition points.

DETAILED DESCRIPTION

A method and apparatus for use in pre-emphasis, and a one-bit generator used in said apparatus, are disclosed. Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description of the present invention, numerous specific details are set forth in order to provide a through understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Portions of the detailed description that follows are presented and discussed in terms of a method. Although steps and sequencing thereof are disclosed in a figure herein (e.g., FIG. 4) describing the operations of this method, such steps and sequencing are exemplary. Embodiments of the present invention are well suited to performing various other steps or variations of the steps recited in the flowchart of the figure herein, and in a sequence other than that depicted and described herein.

Figure 2:
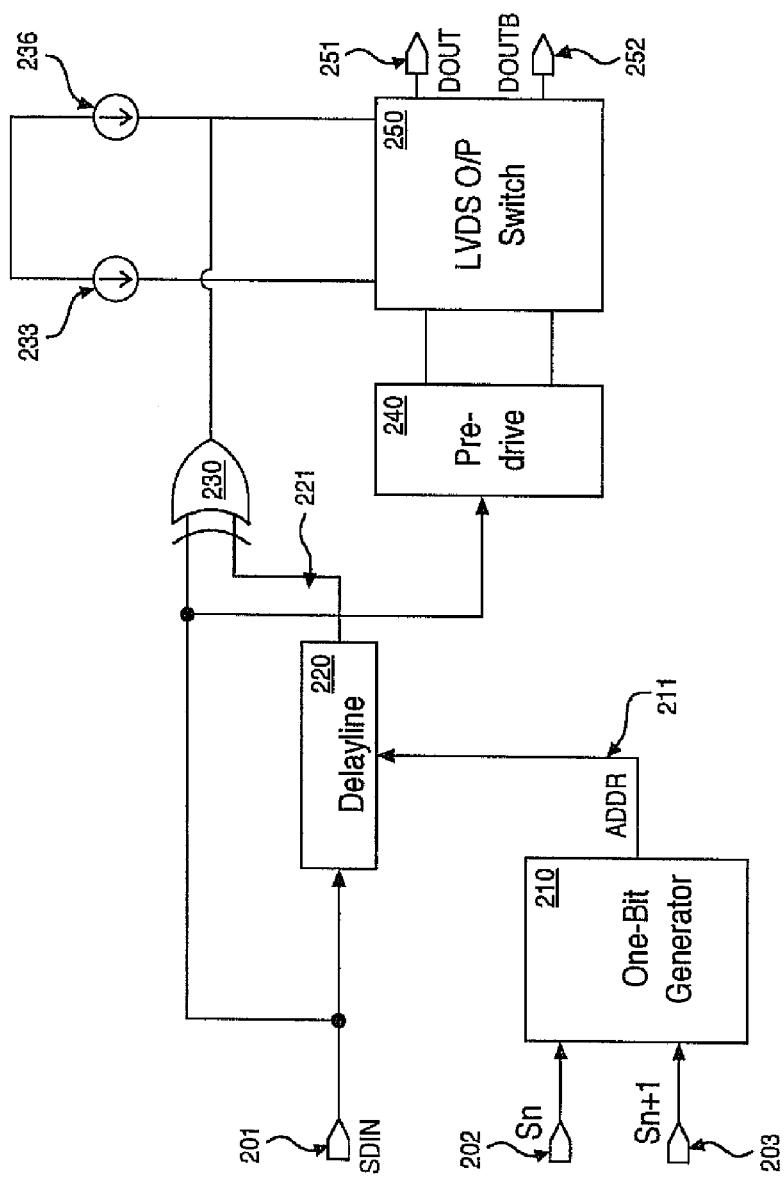
FIG. 2 is a representative circuit diagram of a pre-emphasis circuit, in accordance with one embodiment of the present invention.

With reference now to FIG. 2, a circuit diagram for a circuit used for pre-emphasis is shown, in accordance with one embodiment of the present invention. Pre-emphasis circuit 200, according to one embodiment, receives a number of signals as input, including serialized data input (SDIN) 201, a first strobe signal (Sn) 202, and a second strobe signal (Sn+1) 203. Pre-emphasis circuit 200, according to one embodiment, produces signals as output, including DOUT 251 and DOUTB 252, which are the components of a high-speed pre-emphasized and amplified serialized data signal. Pre-emphasis circuit 200, according to one embodiment, includes one-bit generator 210, delayline 220, XOR gate 230, current source 233 and current source 236, predrive unit 240, and low voltage differential signaling (LVDS) switch 250.

Pre-emphasis circuit 200, according to one embodiment, receives SDIN 201 from a serializer or a similar source of serialized data. SDIN 201 enters pre-emphasis circuit 200, and is passed to delayline 220. Delayline 220 is a programmable delayline. According to one embodiment, delayline 220 is a delayline of 32 100-picosecond stages. 32 stages was selected as being appropriate for one embodiment, related to pre-emphasis in a video application for a portable computing device. The number of stages may vary with applications; delaylines with fewer or additional stages may be appropriate in different circumstances. The intention is to provide sufficient stages to accommodate the intended frequency range for a particular embodiment, as well as potential PVT fluctuations.

Pre-emphasis circuit 200, according to one embodiment, receives Sn 202 from a phase-locked loop (PLL) that is part of the serializer, or a similar source of serialized data, that generates SDIN 201. Sn+1 203 according to one embodiment, is the adjacent, or next, strobe signal from the same source. Because the PLL is locked on to the clock, the time between receipt of Sn 202 and Sn+1 203 very closely approximates one bit-width. Sn 202 is passed to one bit generator 210. Sn+1 203 is passed to one bit generator 210. One bit generator 210 produces address signal (ADDR) 211, as is discussed with reference to FIG. 3, below. According to one embodiment, ADDR 211 indicates how many stages SDIN 201 should be delayed in order to achieve a one-bit-width delay.

According to one embodiment, when delayline 220 receives ADDR 211, it releases the delayed serialized data signal (DSDIN) 221. Unlike with a pre-emphasis approach involving fixed delays, delayline 230 is not be heavily influenced by PVT fluctuations; the signal will be delayed for a single bit-width, even if the individual stages in the delayline fluctuate slightly, as the signal is delayed until the ADDR 211 is received from one bit generator 210.

Figure 1A:
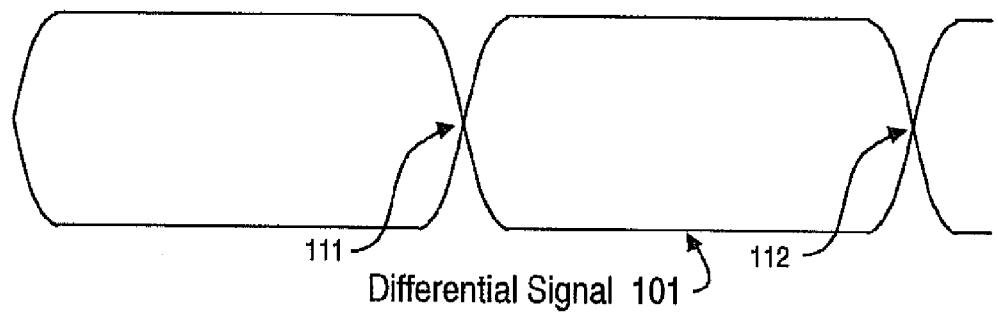
FIG. 1A is a depiction of a differential signal with several transition points.
Figure 1B:
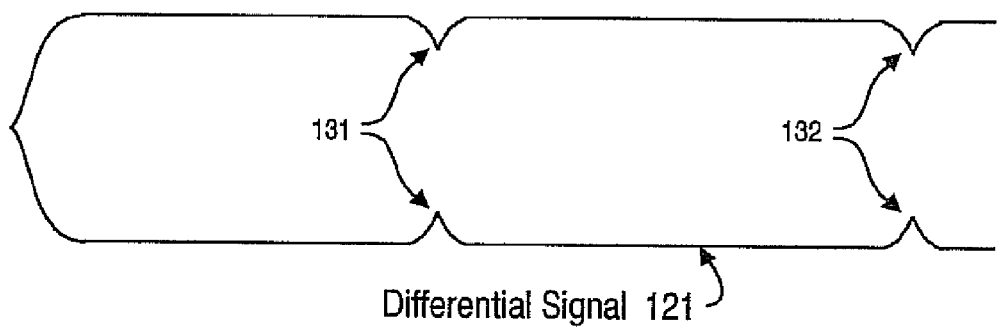
FIG. 1B is a depiction of a differential signal that has degraded.
Figure 1C:
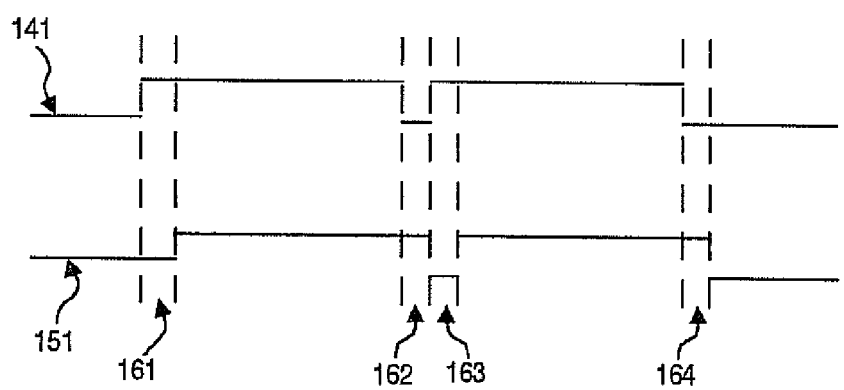
FIG. 1C is a depiction of a serialized signal compared with the same signal delayed one bit-width and identifying transition points, in accordance with one embodiment of the present invention.

SDIN 201 and DSDIN 221, according to one embodiment, are passed to XOR gate 230. Other embodiments use different logic gates to achieve the same result. SDIN 201 and DSDIN 221 are compared by XOR 230, which will only trigger at points where SDIN 201 and DSDIN 221 differ. SDIN 201 and DSDIN 221 will only differ where a transition point occurs in SDIN 201. See FIG. 1C at 161, 162, 163, and 164.

According to one embodiment, the output from XOR 230 is used to control current source 233 and current source 236. When XOR 230 does not trigger, meaning no transition point has been detected, the normal current source 236 is active and the extra current source 233 is inactive. When XOR 230 is triggered, meaning a transition point in SDIN 201 has been detected, extra current source is activated, providing extra current to LVDS 250 at the transition point, and thereby providing pre-emphasis.

According to one embodiment, SDIN 201 is also passed to pre-drive 240. Pre-drive 240, according to one embodiment, amplifies SDIN 201 before it leaves pre-emphasis circuit 200 and is transmitted over a medium, such as a cable. According to one embodiment, pre-drive 240 also converts SDIN 201 from a single-ended data stream into a differential data stream. According to another embodiment, pre-drive 240 and LVDS 250 comprise a single unit.

According to one embodiment, SDIN 201 is passed from pre-drive 240 to LVDS 250. LVDS 250, according to one embodiment, converts SDIN 201 from a single-ended data stream into a differential data stream. LVDS 250 also applies the current from current source 236 to the signal, and the current from current source 233 to the signal at the transition points. LVDS 250 then transmits the amplified differential signal along the medium.

Figure 3:
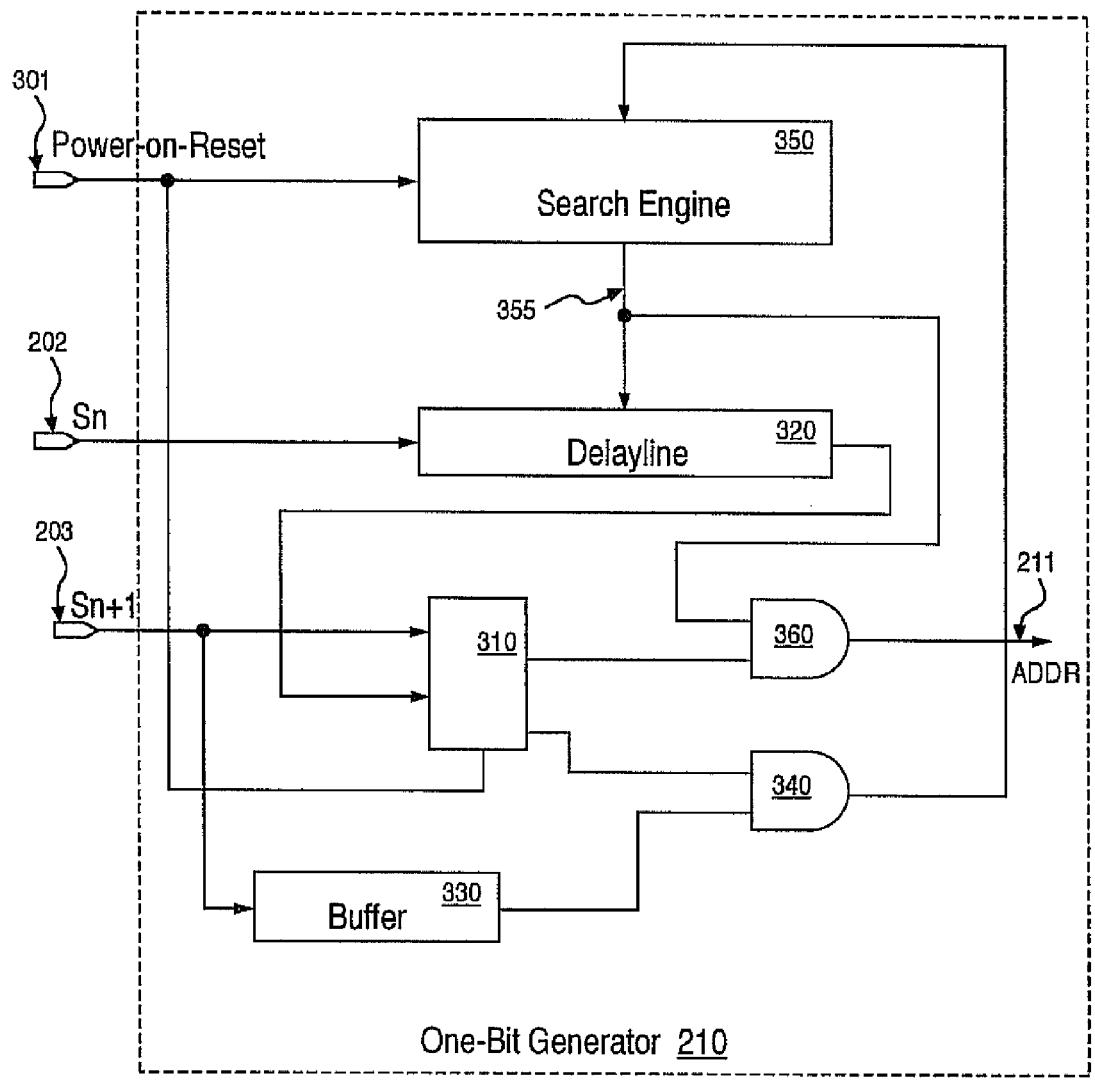
FIG. 3 is a representative circuit diagram of a one-bit generator circuit, in accordance with one embodiment of the present invention.

With reference now to FIG. 3, a circuit diagram for a one-bit generator circuit is shown, in accordance with one embodiment of the present invention. One-bit generator 210, according to one embodiment, receives several signals as input, including power-on-reset signal 301, a first strobe signal (Sn) 202, and a second strobe signal (Sn+1) 203. One bit generator 210, according to one embodiment, produces signals as output, including address signal (ADDR) 365. One bit generator 210, according to one embodiment, includes D-type flip-flop 310, delayline 320, buffer 330, logic gate 340, search engine 350, and logic gate 360.

One bit generator 2110, according to one embodiment, receives power-on-reset signal 301, which is passed to search engine component 350 and D-type flip-flop 310.

One bit generator 210, according to one embodiment, receives Sn 202 and Sn+1 203 from a phase-locked loop (PLL) that is part of the serializer, or a similar source of serialized data, that generates SDIN 201. Sn+1 203, according to one embodiment, is the adjacent, or next, strobe signal from the same source. Because the PLL is locked on to the clock, the time between receipt of Sn 202 and Sn+1 203 very closely approximates one bit-width. Sn 202 is passed to delayline 320.

Delayline 320 is a programmable delayline. According to one embodiment, delayline 320 is a delayline of 32 100-picosecond stages. 32 stages was selected as being appropriate for one embodiment, related to pre-emphasis in a video application for a portable computing device. The number of stages may vary with applications; delaylines with fewer or additional stages may be appropriate in different circumstances. The intention is to provide sufficient stages to accommodate the intended frequency range for a particular embodiment, as well as potential PVT fluctuations. Delayline 320 delays Sn 202, producing DSn 322.

According to one embodiment, Sn+1 203 enters D-type flip-flop 310 as data input, and DSn 322 enters D-type flip-flop 310 as the clock input. Other embodiments may substitute different circuitry. The Q output of D-type flip-flop 310 will be 0 until Sn+1 203 is received by one bit generator 210, after which it will be 1. According to one embodiment, output Q of D-type flip-flop 310 is passed to one input of logic gate 360. According to one embodiment, output Q' of D-type flip-flop 310 is passed to one input of AND gate 340.

According to one embodiment, Sn+1 203 is passed to buffer 330. In one embodiment, buffer 330 is a 6 buffer delay. Buffer 330 connects to the second input of AND gate 340. AND gate 340, according to one embodiment, connects to search engine 350.

According to one embodiment, search engine 350 passes an address signal, ADDR 355, to delayline 320. ADDR 355 instructs delayline 320 to produce DSn 322. ADDR 355 is also passed to logic gate 360 as the second input.

In operation, one embodiment of one bit generator 210 functions in the following manner. Sn 202 is received by one bit generator 210, and enters delayline 320, where it is delayed. At this stage, output Q from D-type flip-flop 310 is 0, Q' is 1, and input D is 0; output from logic gate 340 is 0; and output from logic gate 360 is 0.

When Sn+1 203 is received, it is passed to D-type flip-flop 310 and buffer 330. At this stage, output Q from D-type flip-flop 310 is 0, Q' is 1, and input D is 1; output from logic gate 340 is 0; and output from logic gate 360 is 0.

When Sn+1 203 leaves buffer 330, it enters logic gate 340. At this stage, output Q from D-type flip-flop 310 is 0, Q' is 1, and input D is 1; output from logic gate 340 is 1; and output from logic gate 360 is 0.

Search engine 350 receives input from logic gate 340, determines how long Sn 202 should be delayed, and passes ADDR 355 to delayline 320 and logic gate 360. At this stage, output Q from D-type flip-flop 310 is 0, Q' is 1, and input D is 1; output from logic gate 340 is 1; and output from logic gate 360 is 0.

Delayline 320 releases the delayed strobe signal DSn 322, which is passed to D-type flip-flop 310. DSn 322 functions as a clock for D-type flip-flop 310, triggering the flip-flop. At this stage, output Q from D-type flip-flop 310 is 1, Q' is 0, and input D is 1; output from logic gate 340 is 0; and output from logic gate 360 is 0.

Logic gate 360 receives output Q from D-type flip-flop 310 and ADDR 355 from search engine 350; it then passes the address of the appropriate stage in the delayline out of one bit generator 210 as ADDR 211.

Figure 4:
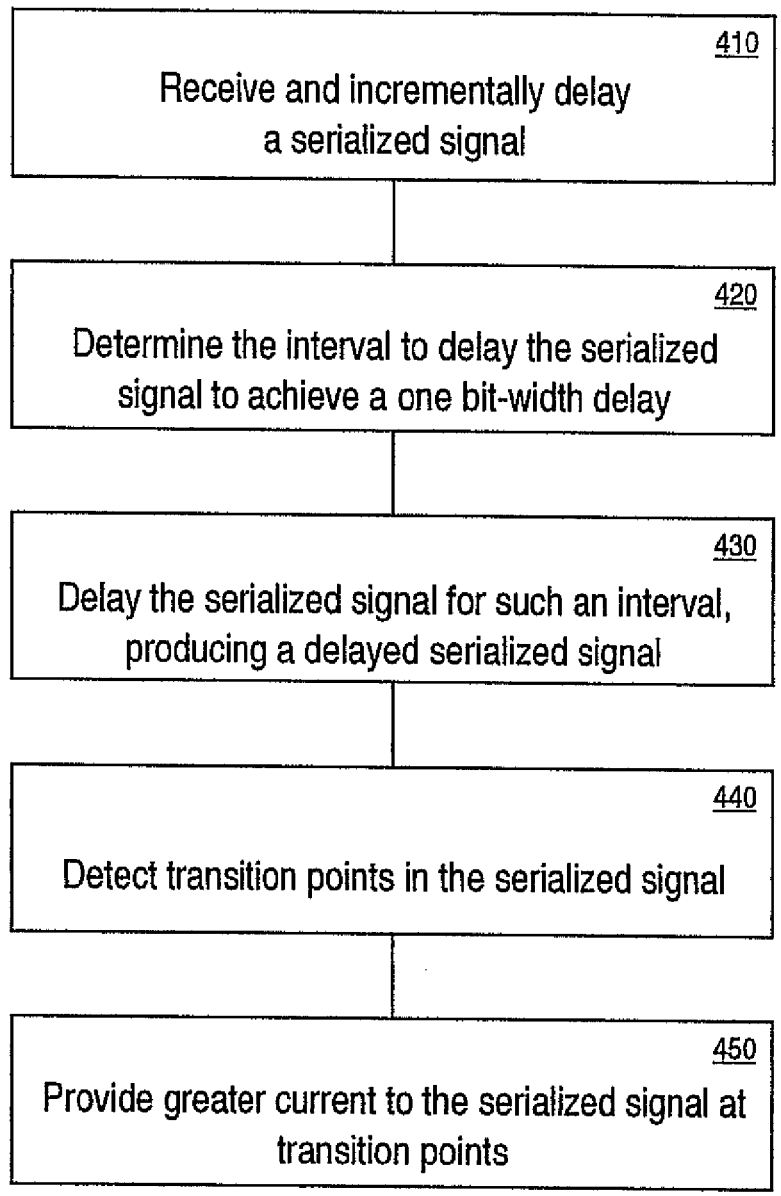
FIG. 4 is a flowchart of a method for implementing pre-emphasis, in accordance with one embodiment of the present invention.

With reference to FIG. 4, a flowchart of a method for implementing pre-emphasis is provided, in accordance with one embodiment of the present invention. According to one embodiment, this method has five steps 410, 420, 430, 440, and 450.

With reference now to step 410 of FIG. 4 and FIG. 2, a serialized signal is received and delayed. According to one embodiment, a serialized signal, SDIN 201, is received by a pre-emphasis circuit, Pre-emphasis circuit 200, and is delayed, by delayline 220.

With reference now to step 420 of FIG. 4 and to FIGS. 2 and 3, the interval to delay the serialized signal to achieve a one-bit-width delay is determined. According to one embodiment, a sub-circuit, one bit generator 210, signals, ADDR 211, the delaying element, delayline 220, when to stop delaying the serialized signal. According to one embodiment, the determination of this interval is accomplished by receipt of, in one bit generator 210, a first strobe signal, Sn 202, and a second strobe signal, Sn+1. The interval between receipts of the two strobe signals is then determined, by one bit generator 210. According to another embodiment, the interval between the two strobe signals is determined by receiving the first strobe signal, Sn 202, and delaying it, in delayline 310, until receipt of the second strobe signal, Sn+1 203, determining how long the first strobe signal was delayed, search engine 350, and returning how long to delay the serialized signal, ADDR 211.

With reference now to step 430 of FIG. 4 and to FIG. 2, the serialized signal is delayed for such an interval, producing a serialized signal. According to one embodiment, the serialized signal, SDIN 201, is delayed, in delayline 220, until the determined interval has passed, as indicated by ADDR 211. After the interval has passed the serialized signal is released, from delayline 220, as a delayed serialized signal, DSDIN 221.

With reference now to step 440 of FIG. 4 and to FIG. 2, transition points in the serialized signal are detected. According to one embodiment, the serialized signal, SDIN 201, and the delayed serialized signal, DSDIN 221, are passed to a logic gate, XOR 230. The serialized signal, SDIN 201, and the delayed serialized signal, DSDIN 221, are compared and transition points are identified, as any point where SDIN 201 and DSDIN 221 do not match is a transition point in SDIN 201.

With reference now to step 450 of FIG. 4 and to FIG. 2, greater current is provided to the serialized signal at transition points. According to one embodiment, when a transition point is detected, by XOR 230, an addition current source, current source 233, is activated and provides additional current to the driver, LVDS 250.

While the method of the embodiment illustrated in FIG. 4 shows specific sequences and quantity of steps, the present invention is suitable to alternative embodiments. For example, not all the steps detailed in the description of the flowchart are required for the present invention. Furthermore, additional steps can be added to the steps presented in the present embodiment. Likewise, the sequences of steps can be modified depending upon the application.

Embodiments of the present invention described above thus relate a method and apparatus for use in pre-emphasis, and a one-bit generator used in said apparatus. While the present invention has been described in particular embodiments, it should be appreciated that the present invention should not be construed as limited by such embodiments, but rather construed according to the below claims.

What is claimed is:

1. An apparatus for pre-emphasis in data serialization comprising:
    a signal delayline to incrementally delay a serialized signal, producing a delayed serialized signal;
    a one bit generator circuit, coupled to said signal delayline, to determine an interval between receipt of a first bit and a second bit, comprising:
        a strobe delayline to incrementally delay a first strobe signal, producing a delayed first strobe signal;
        a logical gate coupled to said strobe delayline, to compare a second strobe signal with said delayed first strobe signal;
        a logical component coupled to said strobe delayline, to determine how long said delayed first strobe signal was delayed;

a comparison gate, coupled to said signal delayline, to detect transition points in said serialized signal by comparing said delayed serialized signal and said serialized signal; and a current source, coupled to said comparison gate, to provide increased current for said serialized signal at detected transition points.

2. The apparatus of claim 1, wherein said signal delayline comprises a 32 stage delayline.

3. The apparatus of claim 1, wherein said strobe delayline comprises a 32 stage delayline.

4. The apparatus of claim 1, wherein said logical gate comprises a D-type flip-flop.

5. The apparatus of claim 1, wherein said comparison gate comprises an XOR gate.

* * * * *